(12) United States Patent
Rittmeyer et al.

(10) Patent No.: US 9,370,083 B2
(45) Date of Patent: Jun. 14, 2016

(54) GROUNDED DIODE PACK

(71) Applicant: HAMILTON SUNDSTRAND CORPORATION, Charlotte, NC (US)

(72) Inventors: Gregory Alan Rittmeyer, Winnebago, IL (US); David S. Behling, Belvidere, IL (US); Timothy R. Welch, Rosco, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 118 days.

(21) Appl. No.: 14/466,652

(22) Filed: Aug. 22, 2014

(65) Prior Publication Data

US 2016/0057844 A1    Feb. 25, 2016

(51) Int. Cl.
*H05F 3/02*    (2006.01)
*H02K 11/00*   (2016.01)
*H02K 11/04*   (2016.01)

(52) U.S. Cl.
CPC ............. *H05F 3/02* (2013.01); *H02K 11/0052* (2013.01); *H02K 11/042* (2013.01)

(58) Field of Classification Search
CPC ................................. H05F 3/02; H02K 11/042
USPC .............................................. 361/220; 310/54
See application file for complete search history.

(56) References Cited

U.S. PATENT DOCUMENTS

| | | | | | |
|---|---|---|---|---|---|
| 4,329,603 | A | * | 5/1982 | Ballard | H02K 11/042 310/54 |
| 4,570,094 | A | * | 2/1986 | Trommer | H01L 25/112 257/E25.025 |
| 5,065,484 | A | * | 11/1991 | Pinchott | H01L 25/112 257/E25.025 |
| 5,319,272 | A | * | 6/1994 | Raad | H02K 11/042 310/54 |
| 5,587,616 | A | * | 12/1996 | Johnsen | H02K 19/36 310/61 |
| 5,773,903 | A | * | 6/1998 | McCabria | H02K 11/042 257/288 |
| 2012/0195003 | A1 | * | 8/2012 | Ford | H02K 11/042 361/699 |

* cited by examiner

*Primary Examiner* — Scott Bauer
(74) *Attorney, Agent, or Firm* — Snell & Wilmer, L.L.P.

(57) ABSTRACT

The present disclosure relates to generators and their components. Specifically, a grounded diode pack is disclosed herein. A design to accommodate non-damaging dissipation static charge build-up is disclosed. Non-damaging dissipation of accumulated charge involves the provision of a suitable electrical path that will allow charges to flow to ground.

15 Claims, 6 Drawing Sheets

GROUNDED DIODE PACK

FIELD

The present disclosure relates to generators and their components, and more particularly, to the interaction of a diode pack and generators.

BACKGROUND

Integrated Drive Generators ("IDG") may supply constant frequency AC electrical power to an aircraft. This may simplify the design of the complete electrical system of the aircraft. The IDG makes use of a highly reliable continuously variable transmission (referred to as the constant speed drive) which converts the variable input speed provided by an aircraft's engine into a constant output speed for the IDG's integral AC generator. Direct drive generators may supply variable frequency AC electrical power to an aircraft. A diode pack may be a component of an IDG and/or a direct drive generator.

SUMMARY

A method of preventing damaging static discharge of a diode pack is disclosed. The method may include coupling an electrically conductive oil transfer tube bushing of the diode pack to a grounding connection, conveying an oil through the electrically conductive oil transfer tube, and dissipating an electrical charge from the oil to the grounding connection via the electrically conductive oil transfer tube bushing.

A diode pack is disclosed. The diode pack may include an electrically conductive oil transfer tube bushing electrically coupled to a DC rail.

The electrically conductive oil transfer tube bushing may include a main body with a cylindrical body having an oil transfer cavity whereby oil may enter the main body. The bushing may also include a conductor plate disposed at one end of the main body and extending radially outward from the main body. The conductor plate may be connected to a coupler in electrical communication with the DC rail such as a positive DC rail, and the positive DC rail may be configured to accommodate non-damaging dissipation of built-up static charge via the oil transfer tube bushing.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step.

The present disclosure relates to the design of a generator component and more particularly, to the design of an integrated drive generator (IDG) diode pack. Aspects of the designs disclosed herein may be applicable to other generators, such as a variable frequency generator and/or an auxiliary generator. In general, a generator includes a stator (which functions as an exciter field) fixed relative to a housing and a rotor (which functions as an exciter armature) rotatable about an axis relative to the stator. The rotor includes a rotor frame carrying a rotor circuit that includes field turns and a rectifier assembly. The rectifier assembly comprises at least one diode. Rotation of the rotor relative to the exciter field induces an alternating current in the exciter armature turns, which is converted to a DC voltage by the rectifier assembly.

Generators can experience rectifier assembly failures due to damaged diodes. One failure mode results from a damaging electrostatic discharge event between the rotor frame and an isolated rotor circuit. The rotor circuit is electrically insulated from the rotor frame. The isolation of the rotor circuit can result in a buildup of a high voltage potential on the rotor circuit relative to the rotor frame under common operational parameters. The voltage potential built up within the isolated rotor circuit discharges to the rotor frame when the voltage potential exceeds an insulation rating of the rotor frame. The voltage discharge can result in a voltage across a diode in the rotor circuit that exceeds the diode voltage rating. This sudden voltage across the diodes results in a reverse bias on each diode. The reverse bias may cause diode break down and/or a short in response to the voltage exceeding the diode voltage rating, thus damaging the rectifier assembly.

Figure 1:
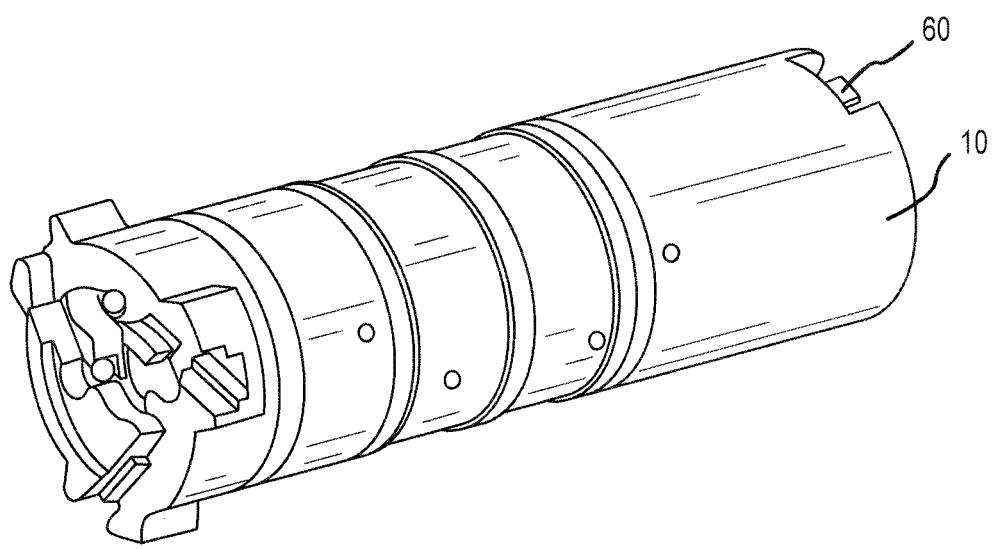
FIG. 1 depicts a diode pack for use with an integrated drive generator in accordance with various embodiments.
Figure 2:
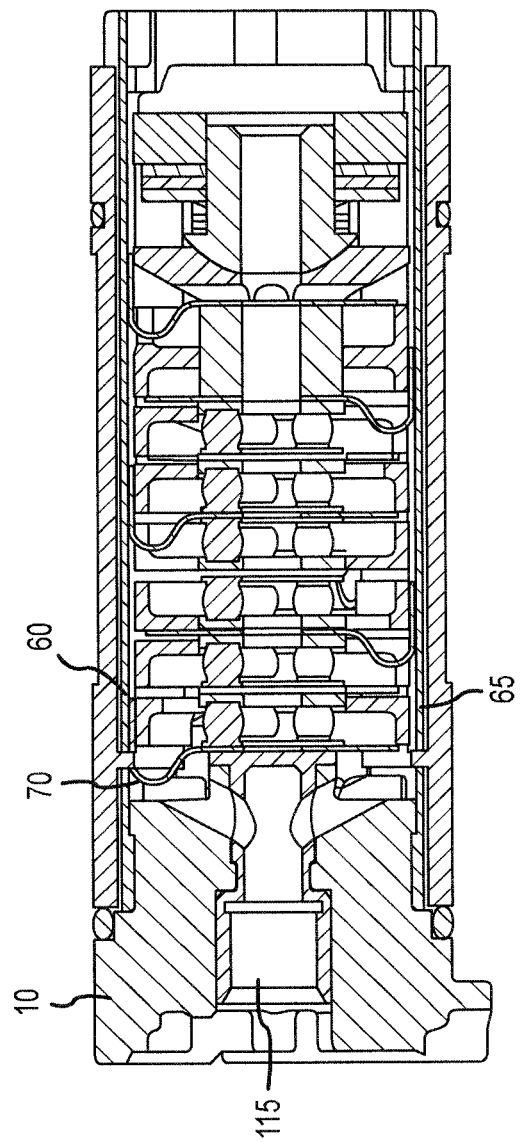
FIG. 2 depicts a cross-sectional side view of the diode pack of FIG. 1 in accordance with various embodiments.
Figure 3:
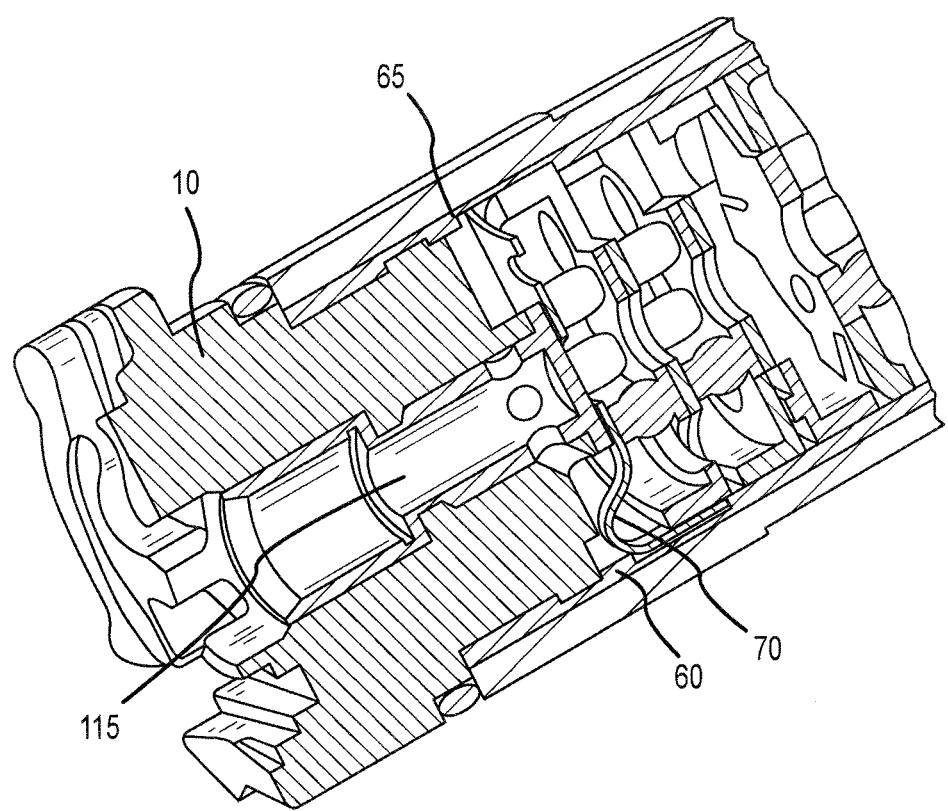
FIG. 3 depicts a close up cross-sectional perspective view of the oil transfer tube bushing of the diode pack of FIG. 2 in accordance with various embodiments.

In accordance with various embodiments, a diode pack 10 is shown in FIGS. 1-3. Diode pack 10 may be used in aerospace applications. Generally, oil cools diode pack 10. While not intending to be bound by theory, when a low conductivity liquid, e.g., oil, flows past a solid surface, the liquid acquires a space charge due to frictional charge separation at the liquid/solid interface. In general, ionic species of one sign are preferentially absorbed by the solid, leaving a net charge of opposite sign in the liquid. The space charge developed in the liquid is transported by the flow, resulting in a streaming current or charging current being carried by the liquid. If the walls of the flow system are insulated or floating, the flow electrification process may also lead to an electrostatic accumulation of charge and the generation of high electrostatic surface potential at liquid/solid interfaces.

With respect to diode failures, the location or "site" which experiences the charge accumulation is typically the electrical circuit within the generator rotor. The electrical circuit within the generator rotor may be insulated from the rotor shaft and may float electrically with respect to the rotor shaft and other IDG components. Various elements of the rotor electrical circuit come in contact with the oil stream in order to thermally cool the rotor. If the static charge of the rotor circuit reaches a high enough potential to break down the insulation system, an electrostatic discharge between circuit and rotor shaft may occur. The discharge event is quick (typically, measured in nanoseconds), but can be sufficiently strong to damage the diodes in the rotor circuit. The energy for this discharge event may come from the parasitic capacitance primarily between rotor circuit elements (windings) and rotor structure (slots). This capacitance is a "distributed" capacitance. Depending upon rotor construction, most or all the static charge voltage may be forced across a main field winding and the rectifier. Voltages in excess of 2000 Volts are typically required to break down the rotor circuit insulation system, and this magnitude is beyond the capability of currently used silicon diodes.

According to various embodiments, an approach to prevent static charge accumulation and the resulting discharge is to use additives and/or an oil selected/fashioned to prevent static charge accumulation.

According to various embodiments, a design to accommodate static charge build-up is to provide for non-damaging dissipation of the charge. Non-damaging dissipation of accumulated charge may involve the provision of a suitable electrical path that may allow charges to flow to ground.

The rotor circuit (exciter armature, diode assembly, and main field) may be electrically insulated from the rotor shaft. Stated another way, the rotor circuit may float electrically with respect to the shaft. An electrical connection between the rotor shaft and a single point within the rotor circuit may have no effect on generator performance, but may control the level of voltage the rotor circuit can achieve with respect to the shaft. A direct connection (or ground) between the rotor circuit and shaft will fix that point of the rotor circuit to the shaft potential. The potential between all other points of the rotor circuit and the shaft may be dictated by normal rotor circuit operation. Likewise, a resistive connection can be made between the shaft and circuit. A resistive connection may hold rotor circuit voltage levels with respect to the shaft low enough to prevent damaging static discharge. Static charge accumulation on the rotor circuit may dissipate at relatively high impedances.

In various embodiments, whether connected directly or through a resistive coupling, the rotor circuit does not achieve a potential sufficient to result in damaging static discharge. Disclosed herein is a connection which provides a path for non-damaging dissipation of the charge. Stated another way, by electrically coupling any singular point of the rotor circuit to the shaft, developing a potential on the rotor circuit relative to the shaft is negated. The highest potential achievable in the rotor circuit relative to the shaft is merely the potential within that circuit itself. Thus, the rotor circuit is prevented from reaching a level where an electrical arc is likely.

Figure 5:
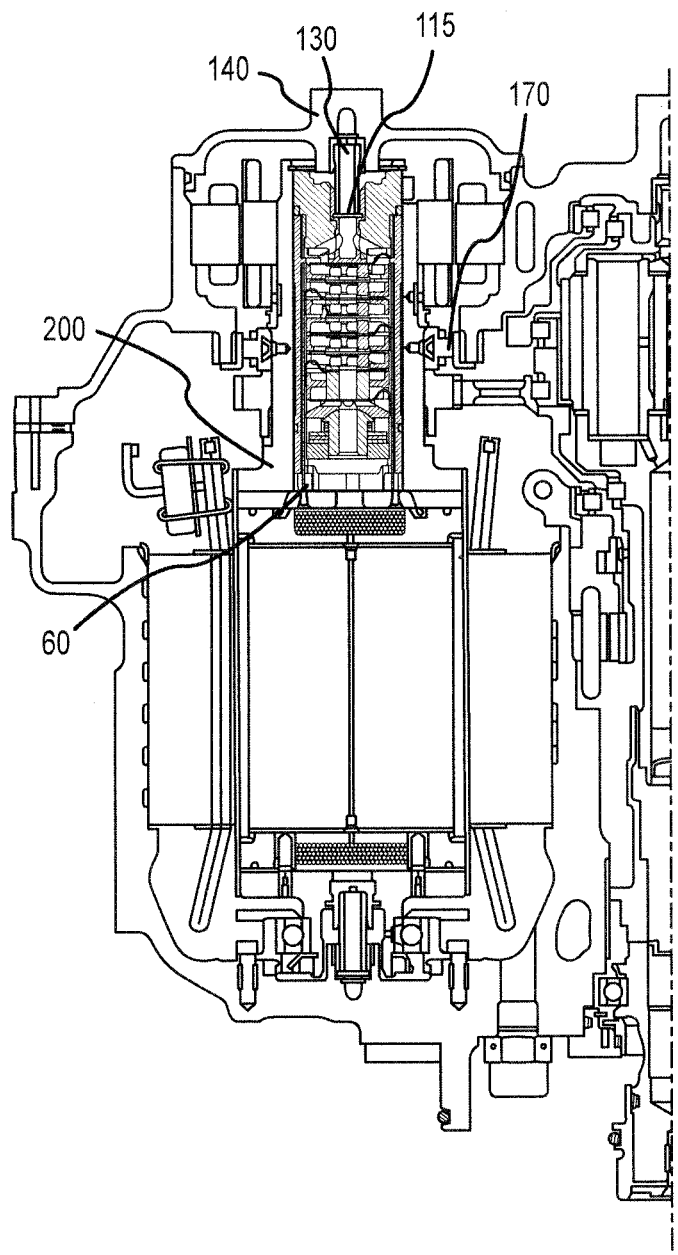
FIG. 5 depicts a partial assembly drawing of an IDG in accordance with various embodiments.

According to various embodiments, and with reference to FIGS. 2, 3, and 5, a diode pack 10 is disclosed where a grounding connection is achieved indirectly through an oil transfer tube bushing 115 of the diode pack 10. Oil transfer tube bushing 115 is conductive. Oil transfer tube bushing 115 may be electrically and physically coupled to a DC rail, for example, the positive DC rail 60, by coupler 70. In this manner, the oil transfer tube bushing 115 may be said to ground the oil traveling through the oil transfer tube bushing 115 to the positive DC rail 60. In further embodiments, the oil transfer tube bushing 115 may be electrically coupled to a negative DC rail 65 or may be electrically coupled to an AC rail, or any other pathway for non-damaging dissipation of electrical charge.

Moreover, with particular reference to FIG. 5, oil transfer tube bushing 115 may be electrically coupled to an oil transfer tube 130. The oil transfer tube 130 may be electrically coupled to the metal housing 140. The metal housing 140 is operatively and electrically coupled to a plurality of bearings 170. The bearings 170 may be operatively and electrically coupled to the rotating rotor shaft 200. Thus, the oil traveling through the oil transfer tube bushing 115 and/or the oil transfer tube 130 may be said to be grounded to the rotating rotor shaft 200. In this manner, the oil traveling through the oil transfer tube bushing 115 and/or the oil transfer tube 130 may be maintained in substantially equipotential with the rotating rotor shaft 200, or in various embodiments, the oil traveling through the oil transfer tube bushing 115 and/or the oil transfer tube 130 may be maintained in a substantially fixed potential (at a given point along the oil path) relative to the rotating rotor shaft 200, so that unwanted electrical discharges from the oil to other components, for example, reverse bias discharges through semiconductors may be ameliorated.

With renewed reference to FIGS. 2, and 3, in addition to FIG. 5, the oil transfer tube bushing 115 may be electrically coupled to the positive DC rail 60, (associated with negative DC rail 65) via, for example, an electrically conductive coupler 70. Thus, the rotating rotor shaft 200 may be maintained in substantially equipotential with the rotating rotor shaft 200, and/or in various embodiments, the oil traveling through the oil transfer tube bushing 115 and/or the oil transfer tube 130 may be maintained in a substantially fixed potential (at a given point along the oil path) relative to the rotating rotor shaft 200, so that unwanted electrical discharges from the oil to other components, for example, reverse bias discharges through semiconductors may be ameliorated.

In various embodiments, the oil transfer tube bushing 115 is not in direct electrical communication with the oil transfer tube 130, however, the oil transfer tube bushing 115 is in direct electrical communication with the oil flowing through the oil transfer tube bushing 115. In this manner, the oil transfer tube bushing 115 may be said to be electrically coupled to an oil transfer tube 130, even if it is not directly contacting the oil transfer tube 130. Thus, one may appreciate that the oil transfer tube bushing 115 may provide a terminus for multiple different electrical paths whereby the rotating rotor shaft 200 is maintained in a substantially fixed potential relative to the positive DC rail 60. By providing a mechanism to dissipate the static charge of the rotor circuit, such as the space charge developed in the oil, the unwanted electrical discharges are ameliorated.

Figure 6:
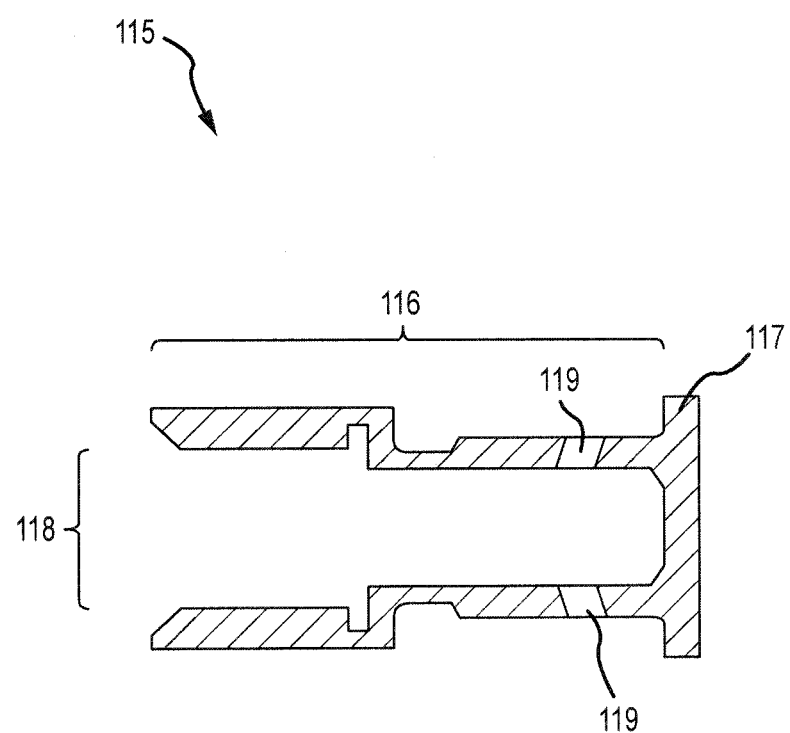
FIG. 6 depicts a detailed view of an oil transfer tube bushing.

With particular reference to FIG. 6, the oil transfer tube bushing 115 may comprise a main body 116 and a conductor plate 117. The main body 116 may comprise a unitary, conductive cylinder unitary with the conductor plate 117 which may be disposed at one end of the main body 116 and which may extend radially outward from the main body 116. The main body 116 may further comprise an oil transfer cavity 118 whereby oil may travel through the main body 116, and may further comprise at least one transfer aperture 119 whereby the oil may exit the oil transfer tube bushing 115 past the obstruction caused by conductor plate 117. In various embodiments, the oil transfer apertures 119 are disposed annularly about main body 116 whereby oil may enter and/or exit the oil transfer cavity 118.

Thus as one may appreciate, the oil transfer tube bushing 115 may maintain electrical contact with an oil traveling through the oil transfer cavity 118 and may maintain electrical contact with a coupler 70 in mechanical connectivity with the conductor plate 117 of the oil transfer tube bushing 115.

With particular reference to FIG. 3, the coupler 70 may comprise a metal tab in direct electrical and mechanical contact with the positive DC rail 60. The metal tab may comprise a spring portion comprising a curved section whereby the metal tab may be pressed into contact against the conductor plate 117 of the oil transfer tube bushing 115.

Figure 4:
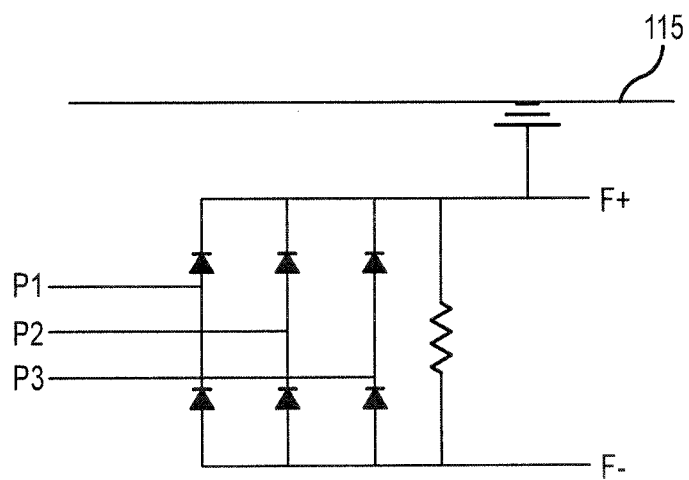
FIG. 4 depicts a rotor circuit in accordance with various embodiments.

Thus, in various embodiments, there is no grounding connection directly from the rotor circuit to the rotor shaft 200. The connection is indirect including a path through at least one oil transfer tube bushing 115. FIG. 4 outlines a high-level representation of the rotor circuit. With this design, static charge accumulation and the resulting discharge to the diode pack assembly that can cause the diodes to fail is prevented. Thus, the diode pack 10 incorporates an electrical ground within the diode assembly that prevents static charge build-up regardless of environmental conditions and oil conductivity.

Having discussed various aspects of a diode pack 10, a diode pack 10 may be made of many different materials or combinations of materials. For example, various components of the diode pack 10 may be made from metal. For example, various aspects of a diode pack 10 may comprise metal, such as copper, silver, gold, titanium, aluminum, steel, or stainless steel, though it may alternatively comprise numerous other materials configured to provide support, such as, for example, composite, ceramic, plastics, polymers, alloys, glass, binder, epoxy, polyester, acrylic, or any material or combination of materials having desired material properties, such as electrical conductivity, heat tolerance, strength, stiffness, or weight. In various embodiments, various portions of a diode pack 10 as disclosed herein are made of different materials or combinations of materials, and/or may comprise coatings.

In various embodiments, diode pack 10 may comprise multiple materials, or any material configuration suitable to enhance or reinforce the electrical conductivity, resiliency and/or support of the system when subjected to wear in an aircraft operating environment or to satisfy other desired electromagnetic, chemical, physical, or material properties, for example parasitic capacitance, parasitic inductance, resistance, heat dissipation, weight, or strength.

In various embodiments, various components may comprise an austenitic nickel-chromium-based alloy such as Inconel®, which is available from Special Metals Corporation of New Hartford, N.Y., USA. In various embodiments, various components may comprise ceramic matrix composite (CMC). Moreover, various aspects may comprise refractory metal, for example, an alloy of titanium, for example titanium-zirconium-molybdenum (TZM).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more."

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of preventing damaging static discharge of a diode pack comprising:
   coupling an electrically conductive oil transfer tube bushing of the diode pack to a grounding connection;
   conveying an oil through the electrically conductive oil transfer tube; and
   dissipating an electrical charge from the oil to the grounding connection via the electrically conductive oil transfer tube bushing.

2. The method according to claim 1, wherein the electrically conductive oil transfer tube bushing is housed within the diode pack.

3. The method according to claim 1, wherein the grounding connection is made via a positive DC rail of the diode pack.

4. The method according to claim 1, further comprising electrically coupling the electrically conductive oil transfer tube bushing to a coupler in electrical connectivity with a positive DC rail of the diode pack.

5. The method according to claim 1, further comprising electrically coupling the electrically conductive oil transfer tube bushing to an electrically conductive oil transfer tube.

6. The method according to claim 5, further comprising electrically coupling the electrically conductive oil transfer tube to a metal housing.

7. The method according to claim 6, further comprising electrically coupling the metal housing to a rotor shaft via a bearing.

8. The method according to claim 1, wherein a rotor circuit associated with the grounding connection is prevented from reaching an electrical potential where an electrical arc will occur.

9. The method according to claim 1, wherein the diode pack is configured for use with an integrated drive generator.

10. A diode pack comprising:
an electrically conductive oil transfer tube bushing electrically coupled to a DC rail.

11. The diode pack of claim 10, wherein the electrically conductive oil transfer tube bushing comprises:
a main body comprising a cylindrical body comprising an oil transfer cavity whereby oil may enter the main body; and
a conductor plate disposed at one end of the main body and extending radially outward from the main body,
wherein the conductor plate is connected to a coupler in electrical communication with the DC rail comprising a positive DC rail, and
wherein the positive DC rail is configured to accommodate non-damaging dissipation of built-up static charge via the oil transfer tube bushing.

12. The diode pack of claim 11, comprising an electrical path between the positive DC rail and a ground whereby the built-up static charge is conducted from the positive DC rail to the ground.

13. The diode pack of claim 10, wherein the electrically conductive oil transfer tube bushing is coupled to an electrically conductive oil transfer tube.

14. The diode pack according to claim 13, wherein the electrically conductive oil transfer tube is electrically coupled to a metal housing.

15. The diode pack according to claim 11, wherein a rotor circuit associated with the diode pack is prevented from reaching an electrical potential where an electrical arc will occur.

\* \* \* \* \*